(12) United States Patent
Fievre et al.

(10) Patent No.: US 6,885,520 B2
(45) Date of Patent: Apr. 26, 2005

(54) INTEGRATED MAGNETIC HEAD COMPRISING A THIN LAYER STRUCTURE

(75) Inventors: Mickaël Fievre, Grenoble (FR); Jean-Baptiste Albertini, Grenoble (FR); Pierre Gaud, Coublevie (FR); Henri Sibuet, Le Fontanil (FR)

(73) Assignee: Commissariat a l'Energie Atomique, Paris (FR)

( * ) Notice: Subject to any disclaimer, the term of this patent is extended or adjusted under 35 U.S.C. 154(b) by 51 days.

(21) Appl. No.: 10/221,673

(22) PCT Filed: Mar. 21, 2001

(86) PCT No.: PCT/FR01/00840
§ 371 (c)(1), (2), (4) Date: Sep. 16, 2002

(87) PCT Pub. No.: WO01/71714
PCT Pub. Date: Sep. 27, 2001

(65) Prior Publication Data
US 2003/0076625 A1 Apr. 24, 2003

(30) Foreign Application Priority Data
Mar. 22, 2000 (FR) ............................................. 00 03635

(51) Int. Cl.⁷ ............................................... G11B 5/147
(52) U.S. Cl. ....................................................... 360/126
(58) Field of Search .......................................... 360/126

(56) References Cited

U.S. PATENT DOCUMENTS

| 5,067,230 A | 11/1991 | Meunier et al. |
| 5,167,062 A | 12/1992 | Castera et al. |
| 5,663,856 A * | 9/1997 | Packard ...................... 360/122 |
| 5,777,824 A * | 7/1998 | Gray ......................... 360/234.8 |

FOREIGN PATENT DOCUMENTS

| EP | 0 216 114 | 4/1987 |
| EP | 0 671 724 | 9/1995 |
| EP | 0 700 033 | 3/1996 |
| JP | 57 141009 | 9/1982 |
| JP | 63 138513 | 6/1988 |
| JP | 2 76111 | 3/1990 |

* cited by examiner

Primary Examiner—A. J. Heinz
(74) Attorney, Agent, or Firm—Oblon, Spivak, McClelland, Maier & Neustadt, P.C.

(57) ABSTRACT

An integrated magnetic head including a thin layer structure. The thin layer structure contains, in the edge of the structure constituting the reading and/or writing face of the magnetic head, two pole pieces separated by a gap and aligned longitudinally. The pole pieces are contained in the transverse direction with respect to the structure between parallel planes of the thin layer structure. The magnetic head bas two layers of wear-resistant material which frame the thin layer structure to reinforce the wear resistance of the reading and/or writing face.

8 Claims, 4 Drawing Sheets

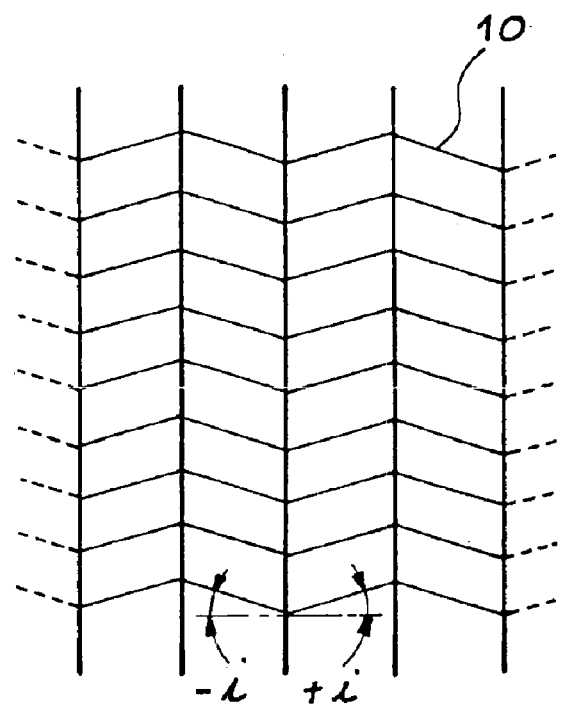
PRIOR ART FIG. 1
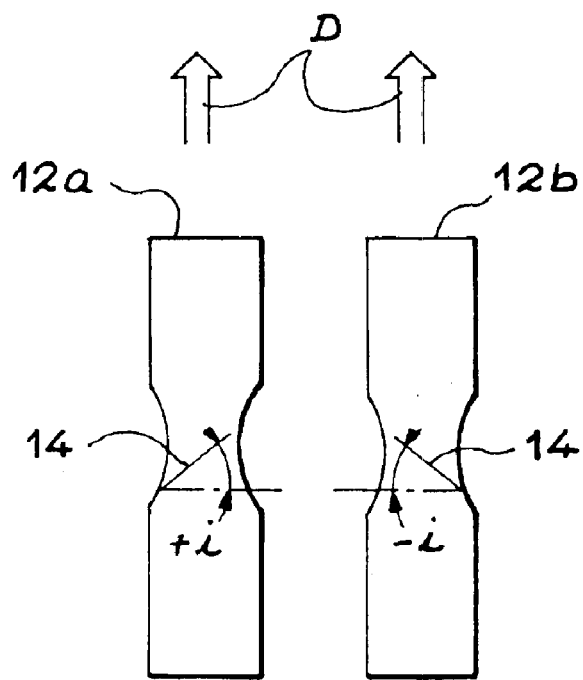
PRIOR ART FIG. 2

INTEGRATED MAGNETIC HEAD COMPRISING A THIN LAYER STRUCTURE

TECHNICAL FIELD

The present invention relates to an integrated magnetic head for helical magnetic recording on tape. It likewise relates to a process of manufacture of such an integrated magnetic head.

The principal field of application of this magnetic head is magnetic recording. More precisely, it relates to consumer or professional video (home video recorders, camcorders)as well as recorders for electronic data processing. The other fields of application are bulk data memories (micro data processing, workstations in large systems)and the storage of data on tape or disk for other consumer applications (multimedia, photo, audio, etc.).

DESCRIPTION OF PRIOR ART

A magnetic recording support for bulk memories (video, audio or data processing) comprises numerous tracks on which information is written in the form of magnetic domains. To increase the information density, the number of data per unit surface is increased. For this purpose, the track width and simultaneously the track separation are reduced, until the tracks are made contiguous, as for example in the helical recording standard. The track width is precisely defined in each standard (for example, 6.7 $\mu$m in the DVC long-play systems).

FIG. 1 shows a particular case in which the tracks 10 are adjacent. To avoid problems of crosstalk between tracks, the bits are written along two opposite angles, +i and −i, with i different from 0°.

As can be seen in FIG. 2, a magnetic head 12a, 12b is allotted to each type of track for reading and/or writing data. For example, the magnetic head 12a for reading and/or writing on a track on which the bits are written along the angle +i has a gap or magnetic spacer 14 situated facing the track (not shown) and having an azimuth different from 0°. The azimuth is the angle between the direction of the gap 14 and a straight line perpendicular to the direction in which the track passes, symbolized by an arrow D in FIG. 2. It is equal to the angle +i in the case of the head 12a.

In the case of the magnetic head 12b for reading and/or writing tracks on which the bits are written along an angle −i, the gap 14 has an azimuth equal to the angle −i.

The two heads can be assembled or not into a single system.

At present, magnetic recording heads which relate to this field and which are available on the market are manufactured by micromachining. The are manufactured singly, without the advantages of mass technology imported from microelectronics. However, with the present reduction of track widths, the necessary heads have dimensions which are more and more reduced. These dimensions are now reaching the limits of micromachining technology.

An alternative method of manufacture has been proposed in patent application FR-A-2 664 729. The method is one of manufacturing integrated magnetic heads with an inclined gap. FIGS. 3A–3C are sectional views illustrating the principal steps of making a magnetic head according to the teaching of this publication. FIGS. 3A–3C relate to an embodiment example in which it is desired to manufacture an integrated head on silicon with a gap inclined at 20° with respect to the vertical of the sheet. For this purpose a substrate of silicon 30 is used, oriented <115> and offset by 0.5°; a recess 32 is formed in it (see FIG. 3A), from one of its principal faces 31, by anisotropic etching. The etching defines an etching profile, in particular with a face 33 inclined according to the desired azimuth.

Etching is followed by a thermal oxidation of the substrate, enabling the gap of the magnetic head to be obtained. FIG. 3B shows the layer of thermal oxide 34 formed on the etched face of the substrate 30. The portion 34A of the oxide layer 34 deposited on the face 33 corresponds to the inclined gap of the magnetic head. The recess is then filled with a magnetic material 35, which may be laminated to remedy eddy current problems. A first pole piece is thus constituted.

To constitute the second pole piece, a portion of the oxide layer adjacent to the gap 34A is eliminated. Selective isotropic etching is then carried out, so as to etch the substrate 30 without attacking the thermal oxide. A second cavity 36 is formed (see FIG. 3C). The cavity 36 is in its turn filled with magnetic material to constitute the second pole piece 37. Thus two pole pieces 35 and 37 are obtained, separated by an inclined gap 34A.

This technique has some disadvantages, which can be grouped into two categories. A first category concerns wear problems, and a second category concerns the shape and alignment of the pole pieces.

In the case of wear problems, it is difficult to find a substrate which enables magnetic heads to be made as disclosed in the publication FR-A-2 664 729 and which also has good mechanical properties to resist wear which may arise from the contact between the magnetic head and the magnetic tape, particularly for the whole lifetime of a professional system. Conventionally, although this is only an example, a silicon substrate is used for making magnetic heads, but silicon has insufficient wear resistance for certain applications.

As regards the shape of the pole pieces, the technique proposed by the publication FR-A-2 664 729 permits the perfect alignment of an edge of the pole pieces (that which corresponds to the face of the substrate from which etching is performed). However, this is not the case for the other edge, which corresponds to the bottom of the two cavities. The tolerances on the thicknesses of the pole pieces (the dimension e indicated in FIG. 3A) are increasingly tight. Taking into account the inhomogeneities of etching over its depth, it becomes difficult to maintain the tolerances.

The portion of the pole pieces which is situated below the line L of FIG. 3C does not take part in the writing of bits. On the other hand, it participates in induced currents. It is thus of interest to minimize it.

Furthermore as regards the shape of the pole pieces, FIG. 4 shows an example of an embodiment in which the second etching 36' has passed under the gap 34A of the magnetic head (see the region 38). Such a head should be automatically eliminated. This means that a second cavity has to be provided, of depth such that the upper tolerance limit on depth does not pass under the gap.

All these problems mean that the method described in the publication FR-A-2 664 729, even though it represents considerable progress in comparison with micro-machined heads, particularly as regards the alignment of the pole pieces, is not simple and remains difficult to industrialize.

SUMMARY OF THE INVENTION

The present invention was intended to conjointly solve the problem of wear of the heads and that of their auto-alignment.

A first object of the invention is constituted by an integrated magnetic head comprising a thin layer structure, the thin layer structure containing, in the edge of the structure constituting the reading and/or writing face of the magnetic head, two pole pieces separated by a gap and in longitudinal alignment, the pole pieces being contained in the transverse direction with respect to the structure between two parallel planes of the thin layer structure, the magnetic head comprising two layers of wear-resistant material which frame the thin layer structure to reinforce the wear resistance of the reading and/or writing face, wherein it likewise comprises an element in layer form containing complementary circuits of the magnetic head, between the thin layer structure and a layer of wear-resistant material.

The gap can if necessary be an inclined gap.

The wear-resistant material can be chosen from among $Al_2O_3$—TiC, $CaTiO_3$ and $ZrO_2$.

The thin layer structure can comprise a layer of monocrystalline silicon containing the pole pieces. It can also comprise a layer, termed stop layer, forming one of the parallel planes of the thin layer structure. This stop layer can be of $SiO_2$.

The pole pieces can be laminated pole pieces.

A second object of the invention is a device for magnetic reading and/or writing constituted by a stack of magnetic heads such as defined hereinabove.

A third object of the invention is constituted by a process of forming at least one integrated magnetic head, comprising the steps of:

providing a substrate comprising a support covered with a layer, termed stop layer, itself covered by a thin layer of monocrystalline material having an appropriate orientation, appropriate anisotropic etching of a first recess in the said thin layer in order to accommodate a first magnetic head pole piece there, the etching exposing the stop layer and producing a recess side along a direction corresponding to a desired azimuth for the gap of the magnetic head, formation of a layer of gap material on the recess side, filling the first recess with a magnetic material coming flush with the free face of the said thin layer to constitute the first pole piece, isotropic etching of a second recess in the said thin layer in order to accommodate a second magnetic head pole piece there, the second pole piece having to be separated from the first pole piece by the gap material, and the etching exposing the stop layer, filling the second recess with a magnetic material coming flush with the free face of the said thin layer to constitute the second pole piece, fixing on the free face of the said thin layer, an element in the form of a layer containing the complementary circuits of the magnetic head (electrical circuits, closure of magnetic circuits, for example), fixing a first layer of wear-resistant material on the element in the form of a layer containing the complementary circuits, elimination of the support to expose the stop layer, fixing a second layer of wear-resistant material on the stop layer, transverse cutting to expose, on the side of the thin layer of monocrystalline material, pole pieces constituted by magnetic material and separated by a gap.

Advantageously, the step of providing a substrate comprises providing a substrate of a silicon-on-insulator type, the insulator being a layer of silicon oxide. The step of formation of a layer of gap material on the recess side can then be a step of thermal oxidation.

The filling of the recesses can be effected by electrolytic deposition followed by forming a plane surface of the deposited magnetic material. This electrolytic deposition can be effected alternately with the deposition of insulating layers, in order to obtain a laminated magnetic material.

The elimination of the support can be obtained by selective etching.

BRIEF DESCRIPTION OF THE DRAWINGS

The invention will be better understood, and other advantages and characteristics will become apparent, on reading the following description, given by way of a non-limitative example and accompanied by the accompanying drawings:

FIG. 1, already described, shows schematically a partial view of a magnetic recording support with contiguous tracks, FIG. 2, already described, shows schematically a system of magnetic heads for reading and/or writing on a recording support having contiguous tracks, FIGS. 3A–3C, already described, are sectional views illustrating the principal steps of formation of a magnetic head according to the prior art, FIG. 4, already described, is a sectional view illustrating a defective magnetic head, formed according to the prior art.

DETAILED DESCRIPTION OF AN EMBODIMENT OF THE INVENTION

FIGS. 5A–5H illustrate the formation of an integrated magnetic head for helical recording on tape, according to the present invention. They are transverse sectional views.

Figure 5:
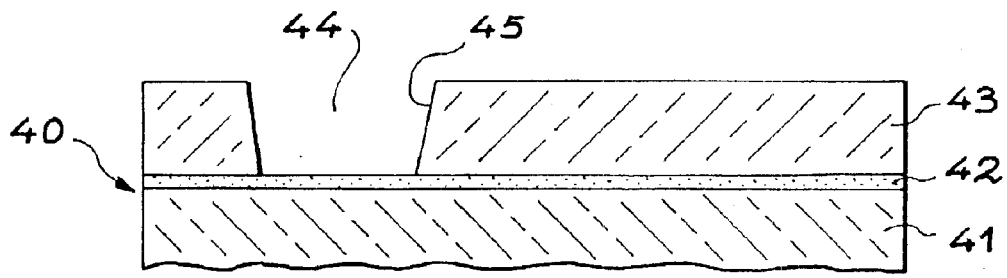
FIGS. 5A–5H illustrate different steps of the formation of an integrated magnetic head according to the invention.
Figure 5:
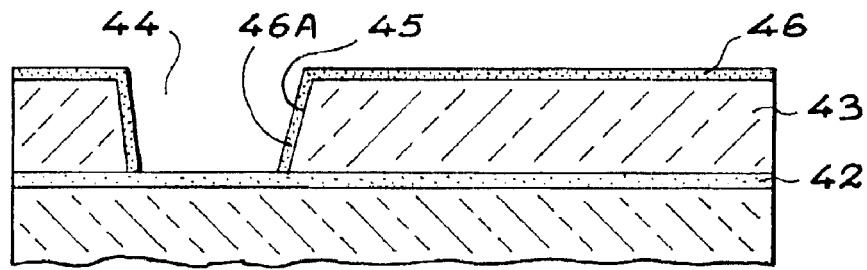
Figure 5:
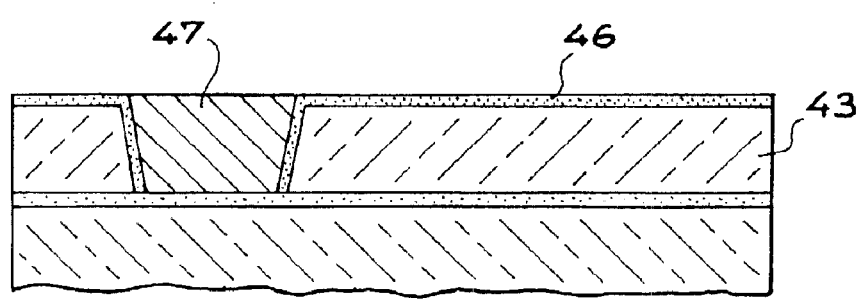
Figure 5:
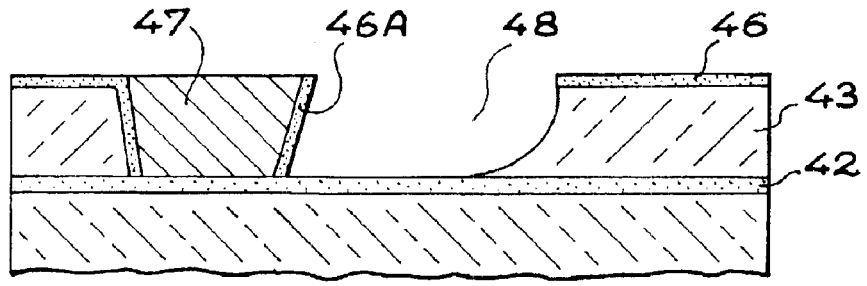

FIG. 5A shows a silicon-on-insulator substrate 40 (or SOI substrate) comprising a support 41 of silicon covered successively with a layer of silicon oxide 42 and a thin layer of monocrystalline silicon 43. The layer of silicon 43 is chosen with a crystalline orientation which is appropriate for the desired gap azimuth. The thickness of the layer 43 is likewise chosen as a function of the desired thickness of the pole pieces to be constituted.

The SOI substrate 40 will be subjected to operations which are well known to those skilled in the art of microelectronics. The thin layer 43 is locally subjected to an anisotropic etching until the oxide layer 42 is reached. The etching time can be slightly longer than needed to eliminate all traces of silicon on the exposed oxide layer 42. A first recess 44 is obtained, the side 45 of which is oriented in conformity with the desired azimuth.

There follows (see FIG. 5B) a thermal oxidation of the silicon of the thin layer 43. A layer 46 of silicon oxide is then formed on the surface of the thin layer 43. A portion 46A of this oxide layer 46 covers the side 45 of the recess 44. This portion 46A will constitute the gap of the magnetic head. The bottom of the recess 44 does not receive any supplementary oxide because this bottom is already of silicon oxide and thus cannot be further oxidized.

An electrolytic deposition of magnetic material, followed by the formation of a plane surface, enables the recess 44 to be filled with magnetic material to constitute the first pole piece 47 (see FIG. 5C). The electrolytic deposition can possibly be effected alternately with the deposition of electrically insulating layers in order to obtain a laminated magnetic material for limiting eddy currents.

The etching is then carried out (see FIG. 5D) of a second recess 48 in the thin layer 43, after the oxide layer 46 has been opened at the appropriate place. An isotropic etching is concerned, which is carried out as far as exposing the oxide layer 42 and is stopped at the portion 46A.

Figure 5E:
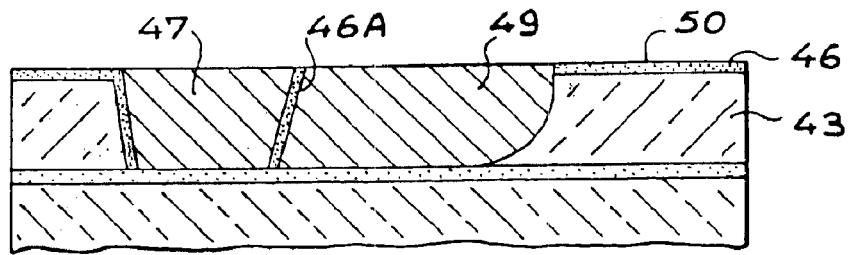

As shown in FIG. 5E, the second recess 48 is filled with magnetic material in the same manner as for the first recess, in order to constitute the second pole piece 49. The upper face 50 or free face of the device, is thus a planar face.

Figure 5F:
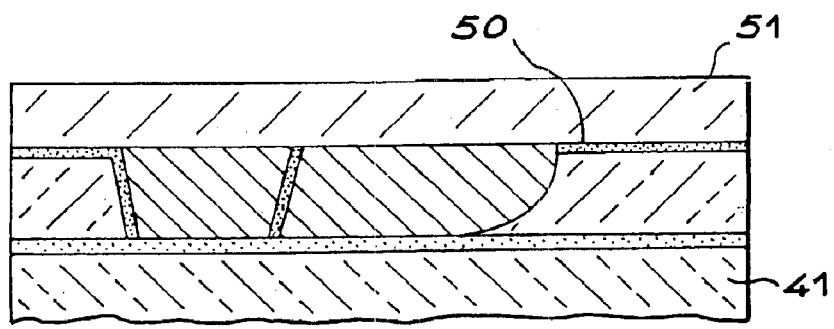

The following step, illustrated by FIG. 5F, consists of forming or fixing on the free face 50 an element 51 in the form of a layer containing the complementary circuits of the magnetic head (for example, coils). At this stage, the functional portion of the magnetic head is completed.

Figure 5G:
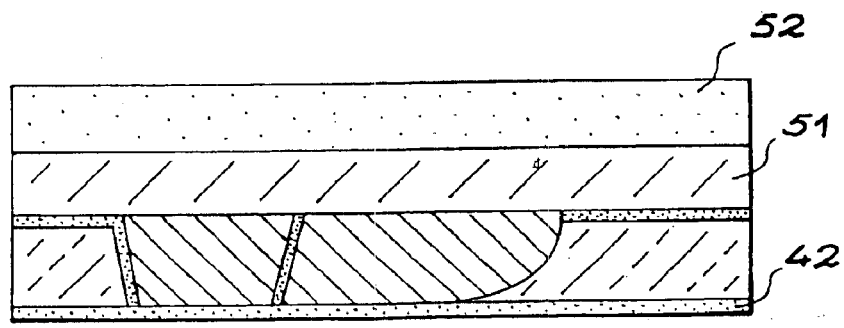
Figure 5H:
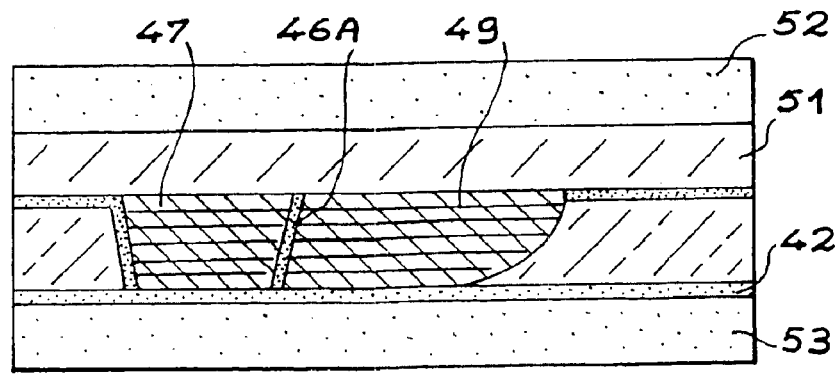

A first layer 52 of wear-resistant material is then fixed to the element 51 in the form of a layer (see FIG. 5G). The support 41 can then be eliminated. This can be effected by selective etching, the oxide layer 42 likewise serving as stop layer for the etching.

A second layer 53 of wear-resistant material is then fixed to the oxide layer 42.

Electrical contacts can be taken up again on the layer 52, for example by means of intra-connections or by etching through the layer 52.

The layers 52 and 53 of wear-resistant material can be of $Al_2O_3$—TiC, of $CaTiO_3$, or of $ZrO_2$.

By way of example, the thin layer 43 of silicon can have a thickness of 8 $\mu$m. The gap 46A can have a thickness of 0.09 $\mu$m.

The process of formation according to the invention has been described as starting with a SOI substrate. However, the process remains valid if the superficial thin layer is of another monocrystalline material. The stop layer can likewise be of a material other than silicon oxide, provided that this material stops etching processes and can be buried under a thin monocrystalline layer. Furthermore, the types of etching can be different, for example of the type used in the publication FR-A-2 716 995. In this case, the advantages provided by the present invention remain, but the etching processes are different and the gap is not inclined.

The present invention enables solution of the problem of wear of silicon by having the head-to-tape contact borne by an assembly largely constituted by wear-resistant materials. The process enables pole pieces to be obtained which are auto-aligned on both sides, since independence from etching inhomogeneities is attained by resting on the sunken stop layer. The thickness of the pole pieces can be set by the thickness chosen for the thin layer of the SOI substrate. The SOI substrates at present available provide very good tolerances which permit the specifications of the recording standards to be complied with.

Figure 3A:
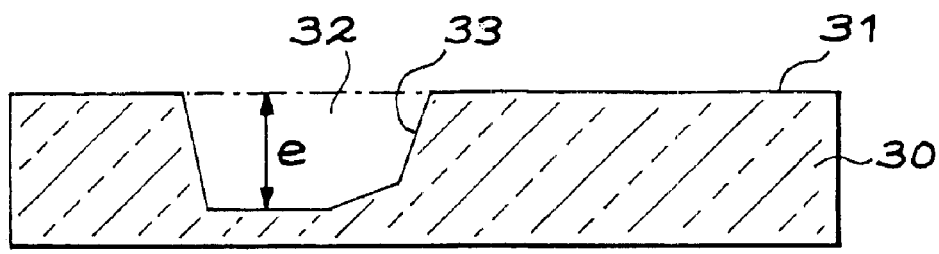
Figure 3B:
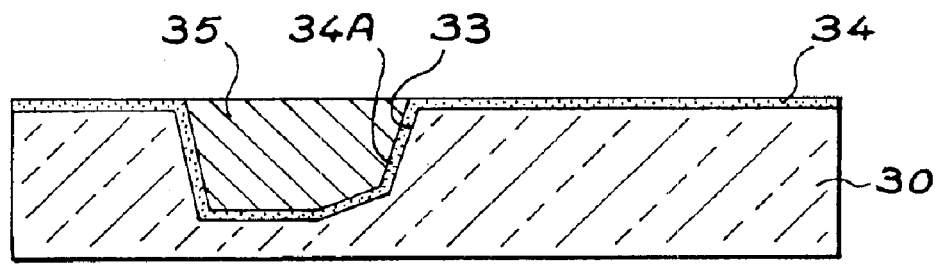
Figure 3C:
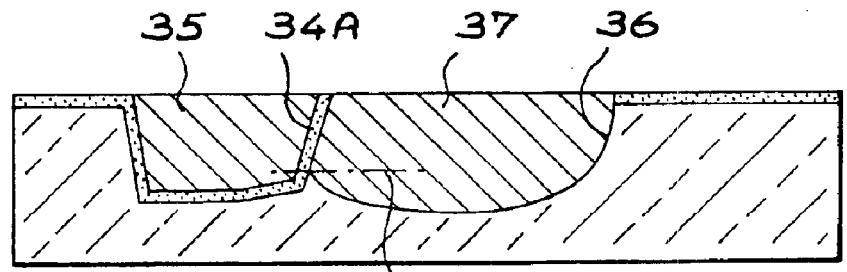
Figure 4:
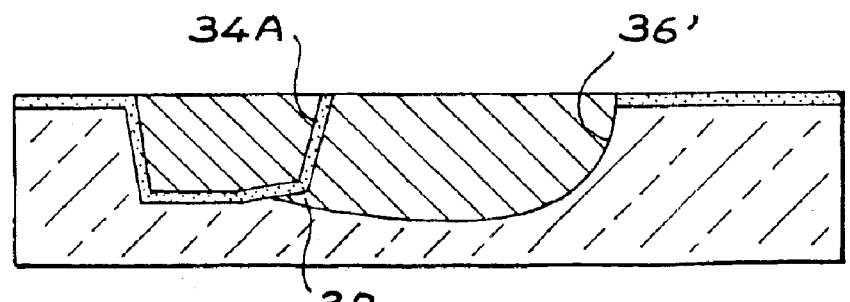

The problem of the second etching passing under the gap, illustrated by FIG. 4, does not exist in the case of the invention.

Frequency performance of the magnetic heads is improved, since the thickness of the magnetic material and the induced currents are minimized.

The invention makes possible a mass manufacturing process of magnetic heads from the same substrate. It permits the formation of multiple heads by using several structures of the type shown in FIG. 5E to stack several levels of pole pieces.

What is claimed is:

1. Integrated magnetic head comprising:
    a first wear-resistant layer forming a thin structure, the first wear-resistant layer having a top surface defining a longitudinal direction parallel thereto;
    a thin layer having a top surface, the thin layer being disposed on the top surface of the first wear-resistant layer;
    first and second pole pieces contained in the thin layer, the first and second pole pieces being separated from each other along the longitudinal direction by a gap;
    a circuit layer having a top surface, the circuit layer being disposed on the top surface of the thin layer;
    complementary circuits of the magnetic head, the complementary circuits being disposed in the circuit layer; and
    a second wear-resistant layer disposed on the top surface of said circuit layer, wherein a common edge of the first wear-resistant layer, the thin layer, the circuit layer, and the second wear-resistant layer forms a face of the magnetic head, and the face of the magnetic head being configured as a reading face, a writing face, or a combination of a reading and writing face.

2. Integrated magnetic head as claimed in claim 1, wherein the gap is inclined with respect to a direction perpendicular to the longitudinal direction.

3. Integrated magnetic head as claimed in claim 1, wherein a wear-resistant material of the first or second wear-resistant layers is chosen from among Al2O3-TiC, CaTiO3, and ZrO2.

4. Integrated magnetic head as claimed in claim 1, wherein the thin layer comprises a layer of monocrystalline silicon containing the two pole pieces.

5. Integrated magnetic head as claimed in claim 1, further comprising:
    an oxide layer disposed between the thin layer and the first wear-resistant layer.

6. Integrated magnetic head as claimed in claim 5, wherein the oxide layer comprises SiO2.

7. Integrated magnetic head as claimed in claim 1, wherein the two pole pieces are laminated pole pieces.

8. Magnetic reading and/or writing device, constituted by a stack of magnetic heads as claimed in claim 1.

* * * * *